(12) United States Patent
Day

(10) Patent No.: US 7,465,367 B2
(45) Date of Patent: Dec. 16, 2008

(54) PROCESS FOR FORMING A LAMINATE

(75) Inventor: Victor Spencer Day, Richmond, VA (US)

(73) Assignee: Innovative Elastics Limited, Limerick (IE)

( * ) Notice: Subject to any disclaimer, the term of this patent is extended or adjusted under 35 U.S.C. 154(b) by 348 days.

(21) Appl. No.: 11/289,396

(22) Filed: Nov. 30, 2005

(65) Prior Publication Data

US 2006/0151092 A1 Jul. 13, 2006

Related U.S. Application Data

(60) Provisional application No. 60/641,769, filed on Jan. 7, 2005.

(51) Int. Cl.
*A61F 13/15* (2006.01)
*B32B 37/00* (2006.01)

(52) U.S. Cl. .................. 156/161; 156/164; 156/229

(58) Field of Classification Search ................ 156/160, 156/161, 163, 164, 229
See application file for complete search history.

(56) References Cited

U.S. PATENT DOCUMENTS

| | | | |
|---|---|---|---|
| 4,666,542 A * | 5/1987 | De Jonckheere | ............ 156/164 |
| 4,762,582 A | 8/1988 | de Jonckheere et al. | |
| 4,842,666 A * | 6/1989 | Werenicz | .................... 156/161 |
| 5,660,664 A * | 8/1997 | Herrmann | .................... 156/161 |
| 5,882,573 A | 3/1999 | Kwok et al. | |
| 5,902,540 A | 5/1999 | Kwok | |
| 5,904,298 A | 5/1999 | Kwok et al. | |
| 6,049,956 A | 4/2000 | Lifke et al. | |
| 2004/0005835 A1 | 1/2004 | Zhou et al. | |

FOREIGN PATENT DOCUMENTS

WO WO 02/18125 A2 3/2002

OTHER PUBLICATIONS

U.S. Appl. No. 11/813,356, filed Jul. 5, 2007, to Victor Spencer Day.

* cited by examiner

*Primary Examiner*—Jeff H Aftergut
(74) *Attorney, Agent, or Firm*—Sughrue Mion, PLLC

(57) ABSTRACT

A process for forming a multi-strand elastic laminate comprising the steps of:
(a) providing a multi-strand elastic feed (1);
(b) feeding the multi-strand elastic via a feed nip roll (2) for further processing;
(c) imparting a tension to the multi-strand elastic feed;
(d) separating the multi-strand elastic feed into strands (4) separated in the cross-direction;
(e) applying a hot melt adhesive to both surfaces of each strand separated in the cross-direction to give adhesive coated separated strands (6); and
(f) sandwiching the adhesive coated separated strands between two further layers of material (7) whereby the further layers of material are adhered to either side of the adhesive coated elastic strands.

24 Claims, 3 Drawing Sheets

PROCESS FOR FORMING A LAMINATE

Priority is claimed under 35 U.S.C. § 119 from U.S. Provisional Application No. 60/641,769, filed Jan. 7, 2005, which is incorporated herein by reference.

The present invention relates to the production of a multi-strand elastic laminate.

In the field of manufacturing disposable products, in particular diapers, training pants, protective underwear & related disposable articles. There is significant interest in the production of multi-layer laminates which have as a central layer, an elastic material and then outer non-woven layers. It is desirable when producing such laminates to use strands of elastic material as opposed to a continuous sheet because a greater control over the elasticity of the final product is possible.

Conventionally such strands of elastic have been applied in multi-layer laminates by using a number of spools or reels. Typically the elastic material used is Spandex or Lycra. Alternative materials include Fulflex Synthetic Polyisoprene System 7000™ and Comfi-Fit®. This material can be purchased pre-wound onto a spool. These materials are arranged as appropriate in the machinery and then unwound via an unwinder such that each spool provides a single strand source of elastic material which can then be applied as required. It is therefore necessary to have a separate spool for each strand of elastic required. A similar technique is used in the textiles industry. It can be envisaged that where a large number of feeds are required, the size of the machinery becomes larger and the process can become very complicated when attempts are made to reduce the spacing between separate strands.

One example of where such elastic materials are used is in WO-A-02/18125. This describes the production of a multi-layer laminate. In one embodiment, the laminate may comprise strands of elastic sandwiched between two non-woven outer layers. In order to achieve adhesion in this case, before bringing the elastic strands, which may be for example, be Spandex, into contact with the non woven-layer, the non-woven layer is sprayed with an adhesive.

As an alternative to using the separated strands as the starting material, it is possible to obtain multi-strand elastic starting material. In order to produce such materials, a rubber product is calendered, vulcanized, slit and then repackaged by bringing the separated strands into contact again. The result is a preslit product which can then be easily separated.

An established technique used in the textiles industry employs a leasing mechanism. In such a method, the feed is firstly placed under tension. This causes the preslit threads to separate and they are then thread alternatively up and down over a glass rod which has a low coefficient of friction at the splitting point. This produces two separated feeds of elastic which can then be further separated or the spacing altered by use of a comb mechanism prior to passing the strands for further processing in the textiles industry.

After separating a multi strand elastic, in order to produce the end laminate, the elastic strands need to be adhered to further layers of material. In order to do this, an adhesive needs to be applied. The adhesive can either be applied to the further material as was done is WO-A-02/18125 or can be applied directly to the elastic strands.

In order to minimise the gathering of the final laminate produced, as noted above, it is advantageous to use elastic strands which are as closely spaced as possible. There is currently a need for a quick and cost effective method by which a multi-strand elastic material can be incorporated into a laminate.

The present invention is concerned with providing a simple and cost effective method for producing a laminate using a multi-strand elastic material. More specifically, the present invention provides a process for forming a multi-strand elastic laminate comprising the steps of:
(a) providing a multi-strand elastic feed;
(b) feeding the multi-strand elastic feed via a feed nip roll for further processing;
(c) imparting a tension to the multi-strand elastic feed;
(d) separating the multi-strand elastic feed into strands separated in the cross-direction;
(e) applying a hot melt adhesive to both surfaces each of the strands separated in the cross-direction to give adhesive coated separated strands; and
(f) sandwiching the adhesive coated separated strands between two further layers of material whereby the further layers of material are adhered to either side of the adhesive coated elastic strands.

The process of the present invention allows use of a multi-strand elastic as a starting material to produce a final laminate wherein the strands in the final laminate may be very closely spaced.

The term "multi-strand elastic" refers to a preslit collection of rubber strands which are bonded together to form a ribbon by virtue of the tackiness of the slit rubber. Upon application of a stretching force, the adhesion between the contacting surfaces of adjacent strands is reduced and the strands separate. Such a multi-strand elastic is formed by calendering, vulcanizing, slitting and then repackaging a rubber product. The multi-strand elastic feed of the present invention may be any natural or synthetic multi-strand elastic. Suitable elastic materials include both natural and synthetic rubber, polyisoprenes, styrene butadiene rubbers, nitrile rubbers, polychloroprene and styrenic block copolymers such as Kraton polymers™. A particularly preferred multi-strand elastic for use in the present invention is Synthetic Polyisoprene Series 7000 available from Fulflex or Comfi-fit™, Fulflex. The number of strands included in the multi-strand elastic is not limited and may range from 2 to 950 but is preferably at least 4 and typically in the range from 10 to 70. The width of the individual strands which make up the multi-strand elastic feed is typically in the range from 0.25 mm to 1.0 mm, preferably 0.25 to 0.5 mm and these strands have a corresponding thickness in the range from 0.1 mm to 0.8 mm, preferably in the range from 0.15 mm to 0.5 mm.

After being fed onto the feed roll, which is typically a nip roll, the multi-strand elastic feed is tensioned. The tension force causes the individual strands of elastic which make up the feed to separate from each other. Such a tensioning force is required to facilitate the manual threading of the feed around the pins. The tensioning force imparted is generally sufficient to give a stretch of up to 400%, more preferably in the range from 200 to 300%.

Preferably the speed of the in feed roller is in the range from 50 to 400 m per minute. This depends on the line speed and on the degree of stretch required. Typical line speeds are in the range from 200 to 700 m/min. The speed of the line, however, is not a limiting factor in the process of separating the multi-strand elastic feed. The size of the tensioning force applied also depends on the degree to which the strands are to be stretched before incorporation into a laminate. In the situation where the stretching required is less than the tensioning force, prior to incorporation into the final laminate, the strands may be relaxed. Where the stretching required exceeds the tensioning force, it may be necessary to include a separate stretching means. As such, apparatus for use in the present invention may include a tensioning means and a stretching means. However, in a preferred embodiment, the tensioning and stretching means are the same piece of apparatus. In the embodiment where the apparatus for use in the present invention includes a stretching means, the stretching force is applied between the feed roll and the means for passing the adhesive coated separated strands for sandwiching between two further layers of material. The stretching force imparted is sufficient to give a total stretch in the range from 50 to 600%, more preferably 300 to 400%. The tensioning means and stretching means are not limited. In one embodiment of the present invention, the stretching force is provided by including a second nip roller downstream of the feed roller.

Once the multi-strand elastic has been placed under tension, it is separated. The present invention is not limited with regard to the nature of the separation step. In one embodiment, the multi-strand elastic may be separated using a glass rod which has a low coefficient of friction at the splitting point. This produces two separated feeds of elastic which can be further separated or the spacing altered by use of a comb mechanism.

In a further embodiment the multi-strand elastic which has been placed under tension may be fed to a series of pins. In this embodiment, the multi-strand elastic feed is manually fed to a series of pins located downstream from the feed roll. The series of pins extends laterally to the machine direction and comprises a first feed pin and a subsequent set of separator pins wherein the spacing of the pins in the series is such that the distance in the cross direction between adjacent pins is less than the diameter of the separator pins. In this embodiment, the multi-strand elastic feed is threaded manually around the feed pin and split such that strands pass around each subsequent pin in the series in the opposite direction to that travelled around the feed pin. The coefficient of friction of the surface of the pins is sufficiently low that the multi-strand elastic passes freely around the pins with the result that the multi-strand elastic is separated into strands separated in the cross direction. The pins are preferably formed from ceramic or glass.

Where such a method is used to separate the multi-strand elastic, generally adjacent pins should be spaced from one another so as to avoid snagging of the elastic e.g. to leave a space of at least 0.7 mm, preferably 1 mm, and more preferably at least 2 mm to facilitate threading. The spacing of adjacent pins is additionally determined by the width of the multi-strand elastic to be used. The spacing should be sufficiently wide to allow product splices or knots to pass through. The diameter of the separator pins is preferably in the range from 5 to 10 mm. Such a diameter is appropriate in order to ensure that the pins do not break when subjected to the pressure of the strands passing around them under tension and, more importantly, to prevent damage during assembly and use by operators. Preferably the diameter of the feed pin in each series is greater than the diameter of the other pins. Preferably the diameter of the feed pin is in the range from 0.85 to 1.10 cm. This is because the pressure exerted on these central pins is greater than the pressure exerted on the subsequent separator pins.

In this embodiment the set of separator pins are preferably arranged at regularly spaced intervals along a line that projects at an angle of from −180 to +180° to the machine direction. Preferably the line is a straight line.

Furthermore, the series of pins comprise two arrays of pins arranged symmetrically about an axis parallel to the machine direction wherein the feed pin in each array lies closest to the axis. In such an embodiment, preferably the subsequent set of separator pins are arranged at regularly spaced intervals along a line wherein the first line of separator pins extends at an angle of between 90 to 180° to the axis and the second line of separator pins projects at an angle of −90° to −180° to the axis. In general, the closer the angle of the line of separator pins is to 180°, the closer the separated strands will be, with minimal distance between adjacent pins. Preferably the first line of separator pins projects at an angle of approximately 160° to the axis and the second line of separator pins projects at an angle of −160°.

In use, the multi-strand elastic feed is fed around the feed pins in the series. Where the series of pins comprises two arrays, a fraction of the feed will pass around one feed pin and the remaining fraction around the other feed pin. The strands are then separated such that the strands of elastic which make up the multi-strand elastic feed pass around each separator pin in the series. The strands pass around the separator pins in a direction which is opposite to the direction travelled around the respective feed pins. The path length of the different strands will be higher for the strands located at the edges of the original feed due to the geometry of the series of pins.

After separation, the spacing of the strands separated in the cross-direction is preferably in the range from 2 to 10 mm. In a particularly preferred embodiment, the spacing of the strands separated in the cross direction is approximately 2.5 mm.

The strands separated in the cross direction may be conveyed by a series of stationary ceramic guides, or rotating guides with a predetermined spacing to the point in the apparatus used where hot melt adhesive is applied. The strands separated in the cross direction may be conveyed over a variety of distances to suit a wide range of converting equipment such as that used in the construction of diapers, training pants, protective underwear and related products.

After the separating step (d), the strands separated in the cross direction are coated with a hot melt adhesive. The hot melt adhesive needs to be soft and suitable for elastic attachment of elastic material to disposable substrates such as nonwoven materials and polyethylene. Examples of appropriate hot melt adhesives are those commonly used in the industry for adhering an elastic material to a non-woven material. As particularly preferred examples of suitable adhesives, EASYMELT 34-173B® available form National Starch & Chemical, USA, HL-8130-E 2P available from H.B Fuller Company, USA and Sanicare SH4-187 HV® available from Henkel, USA can be mentioned.

In one embodiment the adhesive is fiberized.

The hot melt adhesive is applied to the separated elastic strands such a way that it contacts both surfaces of a separated strand. The application of the adhesive is such that the coverage may be either non continuous, partial or continuous. This may be achieved using a non contact process such as spraying. In a preferred embodiment, however, the adhesive is applied as a single serpentine path of adhesive which contacts both surfaces of the single strand to which it is applied. This is preferably achieved using a nozzle assembly. A nozzle assembly generally comprises a series of die plates which form a melt blowing die assembly which in turn are connected to a manifold. Where the adhesive is applied from a nozzle, preferably there are separate orifices corresponding to each separated strand such that hot melt adhesive is applied to each individual strand separately. It is preferred that the nozzle is positioned at a height in the range from 8 to 10 mm above the separated strands. Where such a nozzle is used, preferably the nozzle head is designed to meter the adhesive, and in conjunction with applied air pressure achieves a serpentine path which envelopes an individual separated strand. As will be appreciated, the temperature, air pressure and viscosity of the hot melt adhesive are selected so as to ensure a substantially complete coverage. Suitable nozzle assemblies are described in U.S. Pat. Nos. 5,904,298, 5,882,573 and 5,902,540. In one particularly preferred embodiment, the adhesive is applied from a nozzle which has a width of 25 mm and includes a total of ten orifices spaced evenly across the width of the nozzle. Using such a device, a total of ten strands with a spacing of 2.5 mm can be individually coated simultaneously. As will be appreciated, a number of such nozzle assemblies can be aligned parallel such that the total number of closely separated strands that can be coated simultaneously is not limited. It can thus be envisaged that a multi-strand elastic laminate of any width can be produced by this method.

An advantage of coating the strands individually in this way is that it speeds up the process and further avoids the problem of the closely spaced strands adhering to one another. It also reduces the coating level of hot melt adhesive required. In the present invention, the coat weight of the adhesive on the elastic strands is preferably in the range from 7 to 45 mg/m/strand. Having a low coat weight has the advantage that a softer product can be obtained. More preferably the coat weight of adhesive applied is in the range from 10 to 30 mg/m/per strand.

After the coating step (e), the separated elastic strands are sandwiched between two further layers of material. These two layers may be comprised of the same or different materials. Preferably the further materials are the same and they are both a non-woven material. Suitable non-woven materials have a basis weight in the range from 11 to 17 $gm^{-2}$. As suitable non-woven materials spunbond, carded, SMS or stretch non-wovens can be mentioned. As will be appreciated, the nature of the further layers of material is not limited and they may be any film or substrate including textile and polyethylene. In one embodiment, the non-woven material may be stretchable and has a stretch in the range from 2.5 to 100%. Preferably the two further layers of material are flat i.e. not gathered at the point where that are adhered to the adhesive coated strands.

The multi-strand elastic laminate produced can be used for various applications. For example in diapers, training pants, protective underwear and other products. Alternatively it may be used for non-disposable applications.

FIGURES

Figure 1:
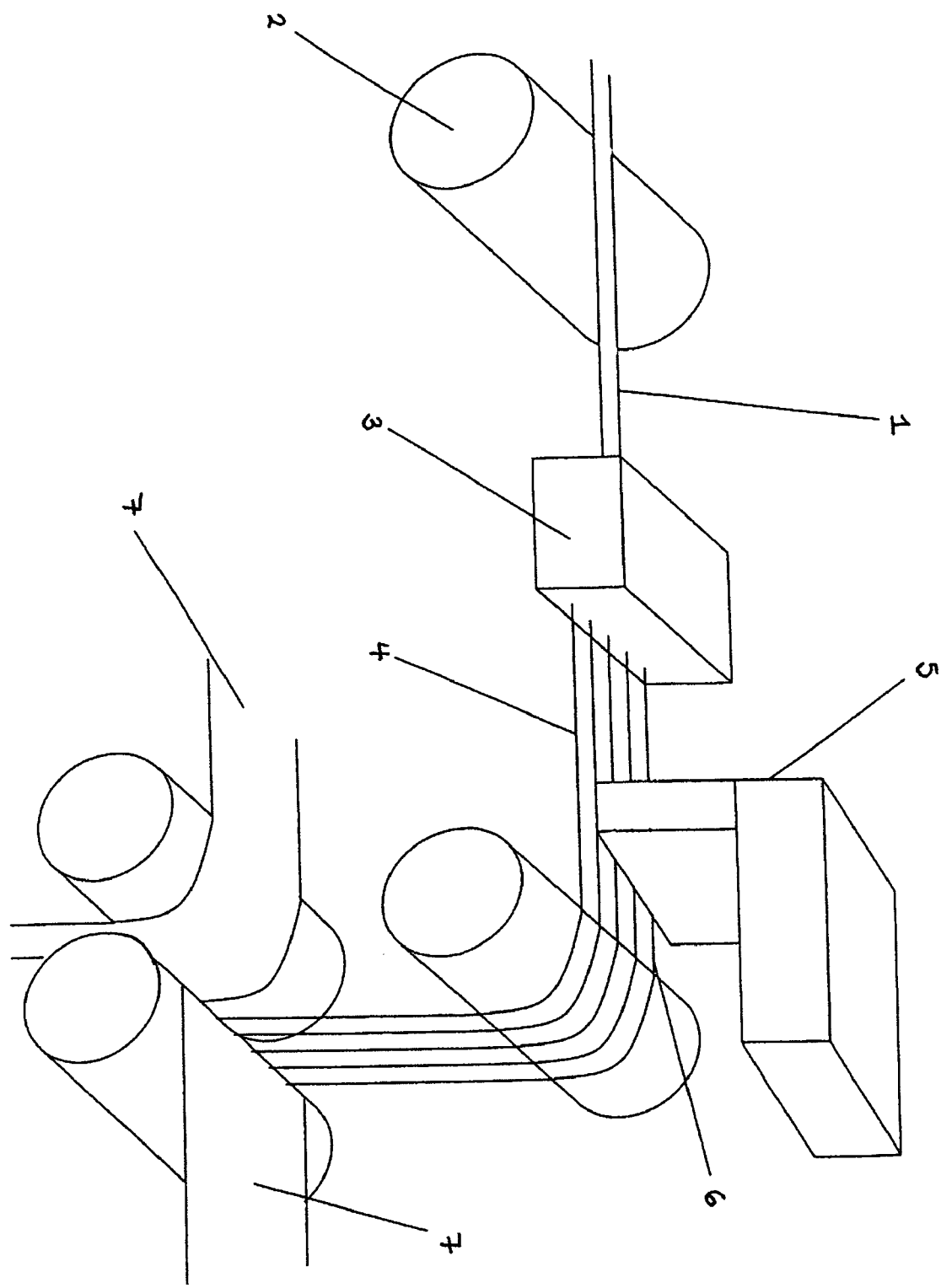
FIG. 1 is a schematic representation of the preferred process.
Figure 2:
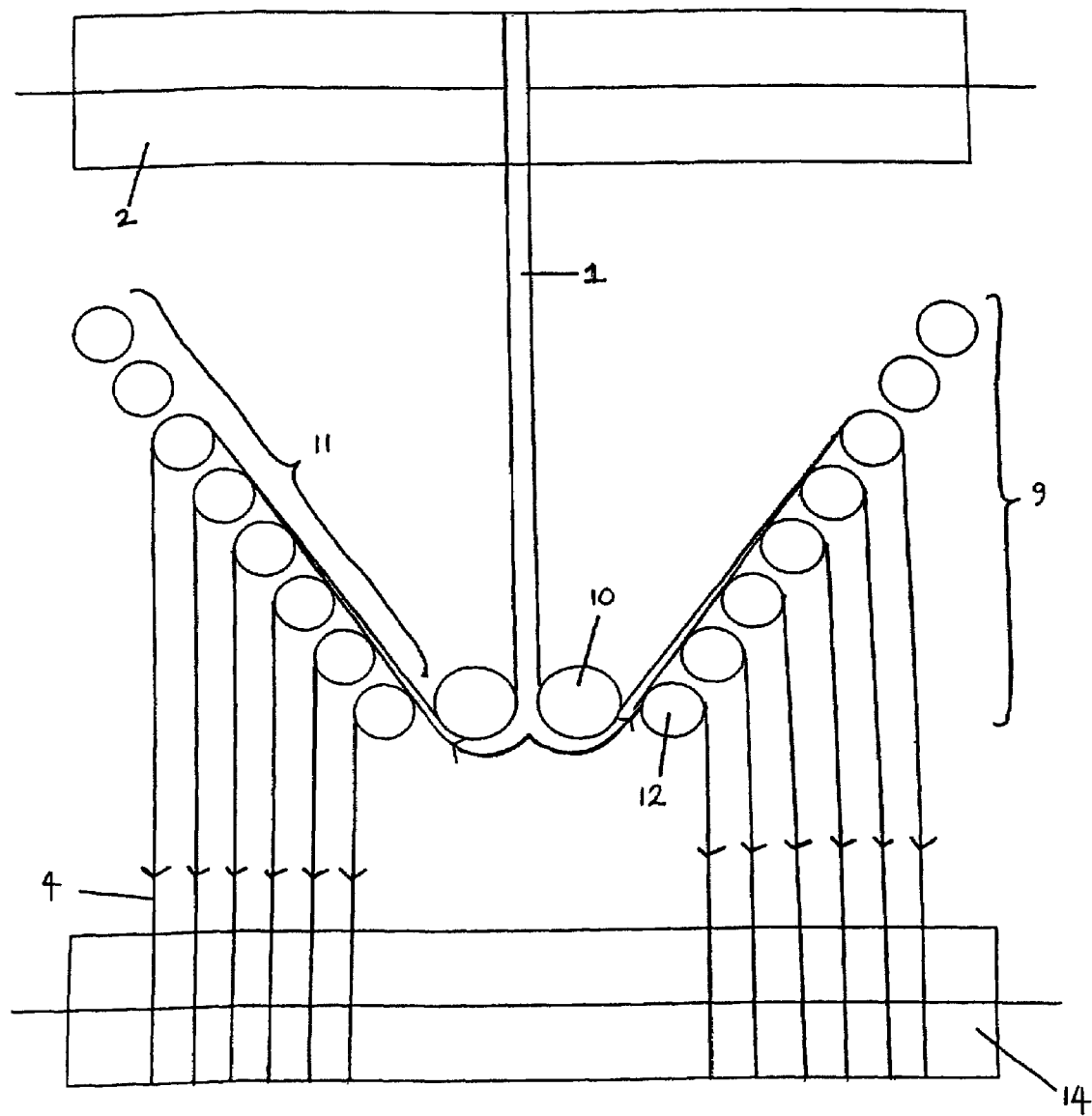
FIG. 2 is a schematic representation of the array of pins used in one embodiment to separate the multi-strand elastic.
Figure 3:
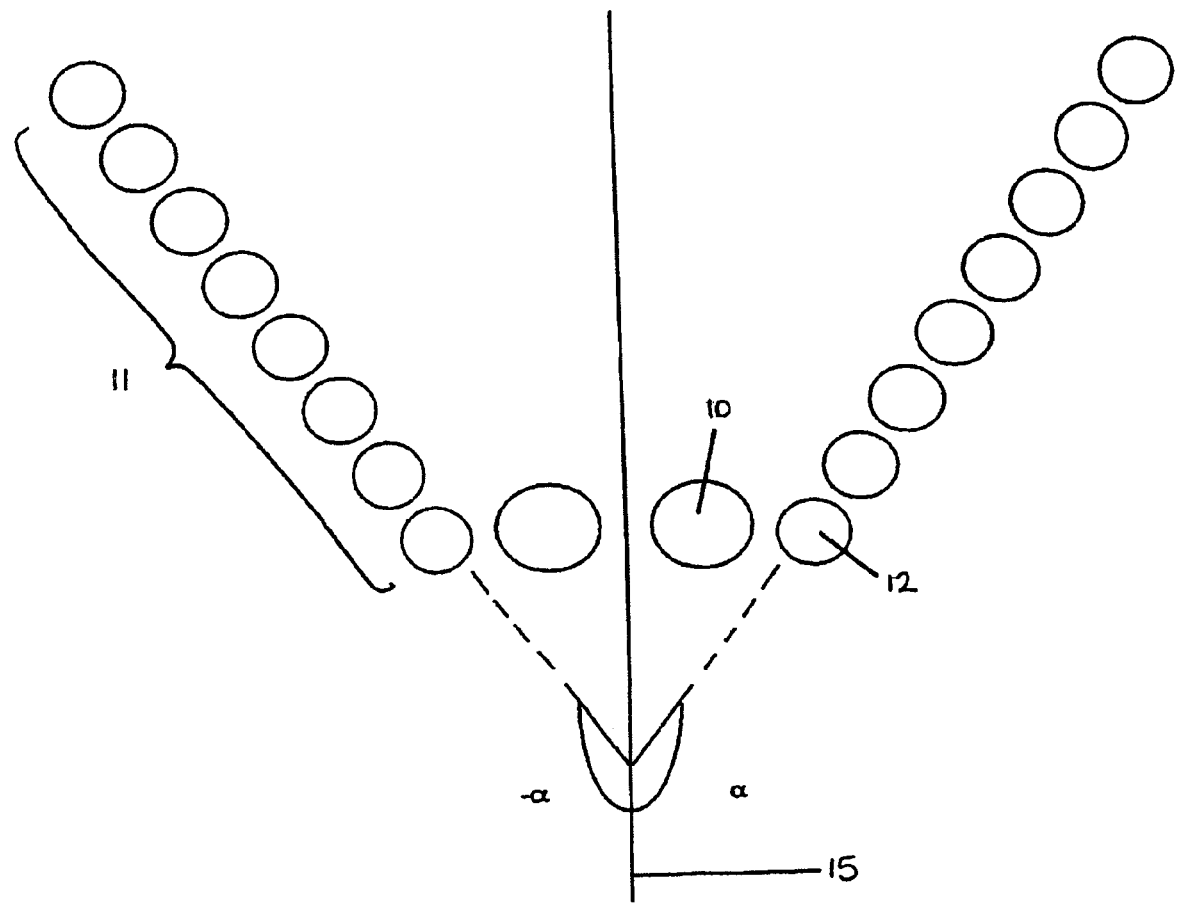
FIG. 3 is a schematic representation of an array of separating pins.

In FIG. 1, a multi-strand elastic (1) is fed around a feed roll (2) and tensioned. It is then fed to a separating device (2) where it is separated into single strands separated in the cross direction (4). As described and illustrated is FIG. 2, the separating device (3) may in one embodiment, be a series of separator pins (9). The pins which make up the series are arranged in a symmetrical fashion about an axis (15) parallel to the machine direction. The series of separator pins comprises two arrays wherein each array comprises a feed pin (10) and a subsequent set of separator pins (11). The separator pins (11) are arranged at regularly spaced intervals along a straight line. The first line of separator pins projects at an angle ($\alpha$) of between 90° and 180° to the axis (15) and the second line of separator pins project at an angle of ($-\alpha$) between $-90°$ and $-180°$ to the axis (15).

The first separator pin (12) in each line is aligned in the cross direction with feed pin (10) of each array. A tension is applied and then half of the multi-strand elastic feed (1) is fed around each of the feed pins respectively and then threaded manually around each of the subsequent pins in the two arrays respectively, in a direction opposite to the direction threaded around the feed pin (10). The result is that the multi-strand elastic feed is separated into strands (4).

In an alternative embodiment which is not shown, the separating device (3) may consist of a glass rod over and under which alternate strands are threaded and then passed to a comb.

The separated strands (4) are then coated with a hot melt adhesive to give adhesive coated separated strands. The device (5) for applying the adhesive is preferably not in contact with the separated strands (4). After coating, the adhesive coated strands (6) are sandwiched between two further materials (7) to form a multi-strand elastic laminate. Although only five strands are illustrated in FIG. 1, it will be appreciated that the number of separated strands is not limited. They may be arranged in a regular spacing across the whole width of the laminate to be produced or they may be arranged as sets of a specified number of strands.

EXAMPLE

The multi-strand elastic, Fulflex Synthetic Polyisoprene System 7000, commercially available from Fulflex was fed to a nip roller. The multi-strand elastic material comprised 45 preslit individual strands of elastic. Each strand had a thickness of 0.31 mm and a width of 0.48 mm. The line speed was 600 ft/min. By virtue of a second nip roller located downstream of th separating device, the multi-strand elastic material was subjected to a stretching force of 160 to 220% to facilitate separation of the individual strands from the multi-strand elastic.

The strands were split into 3 sets of 15 strands using an Arnold dual head splitter with a glass rod and comb set up. The spacing of the separated strands, from centre to centre, was 2.5 mm. The separated strands were then passed to a coating laminator where hot melt adhesive was applied to each individual strand separately. The hot melt adhesive was 8130 adhesive commercially available from H.B. Fuller, USA. The adhesive was applied to each strand with a coat weight of 15 $mgm^{-1}$ per strand. In this example, the coating laminator comprised a series of nozzle assembles. Each nozzle assembly consists of a manifold to which a plurality of die plates which form a melt blowing die assembly, are connected. The plurality of die plates have channels therethrough which are aligned so as to extrude a single serpentine path of adhesive per strand. The melt blowing die assembly has a width of 25 mm. Each fluid dispensing orifice was flanked with air dispensing orifices. The assembly included a total of 10 hot melt adhesive dispensing orifices separated by 2.5 mm such that each orifice was aligned with one of the separated strands.

The hot melt adhesive was applied at a temperature of 150-180° C. The pressurised air ejected through the orifices flanking the hot melt adhesive dispensing orifices was at a pressure of 20 to 70 kPa and temperature of 160 to 200° C.

A serpentine path of Fuller 8130 adhesive was contacted with both surfaces of each individual strand. The adhesive coated strands were then sandwiched between two feeds of non woven material to adhere the non woven material to the elastic. A pressure was applied by nip rollers while the adhesive cured. The non woven material used was spunbound hydrophobic non-woven which had a basis weight of 15 $gm^{-2}$.

The final laminate was collected on a roll and then festooned and trimmed for presentation purposes. The multistrand elastic produced can then, for example, be incorporated into a diaper related article as a sub assembly. The whole process may also be installed directly into a diaper, training part or protective underwear manufacturing line as a direct process.

The invention claimed is:

1. A process for forming a multi-strand elastic laminate comprising the steps of:
    (a) providing a multi-strand elastic feed (1);
    (b) feeding the multi-strand elastic via a feed nip roll (2) for further processing;
    (c) imparting a tension to the multi-strand elastic feed;
    (d) separating the multi-strand elastic feed into strands (4) separated in the cross-direction by a distance in the range from 2 to 5 mm;
    (e) applying a fiberized hot melt adhesive from a nozzle positioned above the strands to both surfaces of each strand separated in the cross-direction, each strand coated separately at a coverage in the range 10 to 40 mg/m/strand, to give adhesive coated separated strands (6); and
    (f) sandwiching the adhesive coated separated strands between two further layers of material (7) whereby the further layers of material are adhered to either side of the adhesive coated elastic strands.

2. The process according to claim 1, wherein the tension imparted in step(c) is sufficient that at the point of sandwiching the adhesive coated strands between two further layers of material in step (f), the adhesive coated elastic strands have a stretch in the range from 100 to 500%.

3. The process according to claim 2, wherein the tension imparted in step (c) is sufficient that at the point of sandwiching the adhesive coated strands between two further layers of material in step (f), the adhesive coated elastic strands have a stretch in the range from 250 to 400%.

4. The process according to claim 1, wherein after step (d), the strands are separated in the cross-direction by a distance of approximately 2.5 mm.

5. The process according to claim 1, wherein, in step (d), the multi-strand elastic feed is separated by
    (i) manually feeding the multi-strand elastic feed under tension to a series of pins (9) located downstream from the feed roll (2), said series extending laterally to the machine direction (15), the series comprising a first feed pin (10) and a subsequent set of separator pins (11) wherein the spacing of the pins in the series is such that the distance in the cross-direction between adjacent pins is less than the diameter of the separator pin;
    wherein the multi-strand elastic is threaded manually around the feed pin and then split such that strands pass around each subsequent pin in the series in the opposite direction to that travelled around the feed pin and the coefficient of friction of the surface of the pins is sufficiently low that the multi-strand elastic passes freely around the pins with the result that the multi-strand elastic feed is split into strands separated in the cross direction.

6. The process according to claim 5, wherein the first separator pin in each set is aligned in the cross direction with the feed pin.

7. The process according to claim 5, wherein the pins are made from glass or ceramic.

8. The process of claim 5, wherein the separator pins are arranged at regularly spaced intervals along a line that projects at an angle in the range from −180° to +180° of the machine direction.

9. The process of claim 5, wherein the series of pins comprises two arrays of pins arranged symmetrically about an axis parallel to the machine direction.

10. The process of claim 5, wherein the series of pins comprises two arrays of pins arranged symmetrically about an axis parallel to the machine direction wherein the feed pin in each array lies closest to the axis and the subsequent set of separator pins are arranged at regularly spaced intervals along a line wherein the first line of separator pins projects at an angle of between 90 to 180° to the axis and the second line of separator pins projects at an angle of between −90° to +180° to the axis.

11. The process according to claim 5, wherein the first line of separator pins projects at an angle of 160° to the axis and the second line of separator pins projects at an angle of −160° to the axis.

12. The process according to claim 5, wherein the diameter of the separator pins is in the range from 0.5 to 0.7 cm.

13. The process according to claim 5, wherein the diameter of the feed pins is in the range from 0.85 to 1.10 cm.

14. The process according to claim 1, wherein after step (d), the strands separated in the cross-direction are passed via a nip roll to step (e).

15. The process according to claim 1, wherein in step (e) a single serpentine path of hot melt adhesive is applied to each separated strand.

16. The process according to claim 1, wherein in step (e), the hot melt adhesive is applied from a nozzle positioned at a distance in the range from 8 to 10 mm above the strands separated in the cross-direction.

17. The processing according to claim 16 wherein the device is a 25 mm wide nozzle which has ten orifices separated by 2.5 mm.

18. The process according to claim 1, wherein the two layers of further material are the same.

19. The process according to claim 1, wherein the two layers of further material are different.

20. The process according to claim 1, wherein the further material is a non-woven material.

21. The process according to claim 1, wherein the further material is a stretchable non-woven material.

22. The process according to claim 1, wherein the two layers of further material are flat when the adhesive coated separated strands are sandwiched between them.

23. A process for forming a multi-strand elastic laminate comprising the steps of:
    (a) providing a multi-strand elastic feed (1) having 10 to 70 strands;
    (g) feeding the multi-strand elastic via a feed nip roll(2) for further processing;
    (h) imparting a tension to the multi-strand elastic feed;
    (i) separating the multi-strand elastic feed into strands (4) separated in the cross-direction by a distance in the range from 2 to 5 mm;
    (j) applying a fiberized hot melt adhesive from a nozzle positioned above the strands to both surfaces of each strand separated in the cross-direction, each strand coated separately at a coverage in the range 10 to 40 mg/in/strand, to give adhesive coated separated strands (6); and
    sandwiching the adhesive coated separated strands between two layers of non-woven material that are flat when the adhesive coated separated strands are sandwiched between them whereby the two layers of non-woven material are adhered each to one side of the adhesive coated elastic strands.

24. The process of claim 23 wherein the tension imparted in step (c) is sufficient that at the point of sandwiching the adhesive coated strands between two layers of non-woven material in step (f), the adhesive coated elastic strands have a stretch in the range from 100 to 500%.

* * * * *